US010104099B2

United States Patent
Szekely

(10) Patent No.: US 10,104,099 B2
(45) Date of Patent: Oct. 16, 2018

(54) SYSTEM AND METHOD FOR MONITORING A COMPUTER SYSTEM USING MACHINE INTERPRETABLE CODE

(71) Applicant: COUNTERTACK, INC., Santa Monica, CA (US)

(72) Inventor: Amir Szekely, Los Angeles, CA (US)

(73) Assignee: Countertack, Inc., Santa Monica, CA (US)

( * ) Notice: Subject to any disclaimer, the term of this patent is extended or adjusted under 35 U.S.C. 154(b) by 39 days.

(21) Appl. No.: 14/990,575

(22) Filed: Jan. 7, 2016

(65) Prior Publication Data

US 2016/0197946 A1    Jul. 7, 2016

Related U.S. Application Data

(60) Provisional application No. 62/100,797, filed on Jan. 7, 2015.

(51) Int. Cl.
*G06F 21/50* (2013.01)
*G06F 21/55* (2013.01)
(Continued)

(52) U.S. Cl.
CPC ............ *H04L 63/1416* (2013.01); *G06F 8/41* (2013.01); *G06F 9/30189* (2013.01);
(Continued)

(58) Field of Classification Search
CPC ...................................................... G06F 21/55
See application file for complete search history.

(56) References Cited

U.S. PATENT DOCUMENTS

| 5,339,426 A | 8/1994 | Aoshima |
| 5,621,886 A | 4/1997 | Alpert et al. |

(Continued)

FOREIGN PATENT DOCUMENTS

| JP | 2005-316779 | 11/2005 |
| WO | WO 2006/113781 A1 | 10/2006 |
| WO | WO 2007/027739 | 3/2007 |

OTHER PUBLICATIONS

Asrigo, Using VMM-Based Sensors to Monitor Honeypots, Jun. 14, 2006, 11 pgs.

(Continued)

*Primary Examiner* — Fatoumata Traore
(74) *Attorney, Agent, or Firm* — Morgan, Lewis & Bockius LLP

(57) ABSTRACT

A computer implemented method of monitoring a collector computer system includes receiving machine interpretable code that is configured for interpretation by the interpreter that includes: information identifying a first set of one or more monitoring targets within the collector computer system, a method for monitoring the first set of one or more monitoring targets, and predefined reporting criteria. The method also includes interpreting the machine interpretable code with an interpreter; monitoring at least a subset of the first set of one or more monitoring targets for candidate activity that satisfies the predefined reporting criteria by executing compiled instructions that correspond to the method for monitoring the first set of one or more monitoring targets; obtaining candidate event information that is associated with the candidate activity; and reporting the candidate event information to a computer system that is distinct from the collector computer system.

20 Claims, 8 Drawing Sheets

(51) Int. Cl.
*H04L 29/06* (2006.01)
*G06F 9/455* (2018.01)
*G06F 8/41* (2018.01)
*G06F 9/30* (2018.01)

(52) U.S. Cl.
CPC .......... *G06F 9/45508* (2013.01); *G06F 21/55* (2013.01); *H04L 63/14* (2013.01); *H04L 63/145* (2013.01); *H04L 63/205* (2013.01); *G06F 2221/2127* (2013.01)

(56) References Cited

U.S. PATENT DOCUMENTS

| | | |
|---|---|---|
| 5,664,159 A | 9/1997 | Richter et al. |
| 5,740,413 A | 4/1998 | Alpert et al. |
| 6,009,274 A | 12/1999 | Fletcher et al. |
| 6,279,113 B1 | 8/2001 | Vaidya |
| 6,343,280 B2 | 1/2002 | Clark |
| 6,360,327 B1 | 3/2002 | Hobson |
| 6,446,062 B1 | 9/2002 | Levine et al. |
| 7,222,366 B2 | 5/2007 | Bruton, III et al. |
| 7,392,543 B2 | 6/2008 | Szor |
| 7,464,407 B2 | 12/2008 | Nakae et al. |
| 7,581,219 B2 | 8/2009 | Neiger et al. |
| 7,596,654 B1 | 9/2009 | Wong |
| 7,996,836 B1 | 8/2011 | McCorkendale et al. |
| 8,204,984 B1 | 6/2012 | Aziz et al. |
| 8,365,180 B2 | 1/2013 | Kawasaki et al. |
| 8,448,170 B2 | 5/2013 | Wipfel et al. |
| 8,539,582 B1 | 9/2013 | Aziz et al. |
| 8,572,613 B1 | 10/2013 | Brandwine |
| 8,683,548 B1 | 3/2014 | Curry et al. |
| 8,776,050 B2 | 7/2014 | Plouffe et al. |
| 8,943,506 B2 | 1/2015 | Tang et al. |
| 8,949,826 B2 | 2/2015 | Fitzgerald et al. |
| 2001/0011254 A1 | 8/2001 | Clark |
| 2002/0099752 A1 | 7/2002 | Markos et al. |
| 2002/0166063 A1 | 11/2002 | Lachman, III et al. |
| 2002/0194437 A1 | 12/2002 | Kapoor et al. |
| 2003/0023656 A1 | 1/2003 | Hutchison et al. |
| 2003/0120935 A1 | 6/2003 | Teal et al. |
| 2004/0025052 A1 | 2/2004 | Dickenson |
| 2004/0153672 A1 | 8/2004 | Watt et al. |
| 2004/0177269 A1 | 9/2004 | Belnet et al. |
| 2004/0225877 A1 | 11/2004 | Huang |
| 2004/0250124 A1* | 12/2004 | Chesla ................ G06F 21/552 726/13 |
| 2005/0229250 A1 | 10/2005 | Ring et al. |
| 2006/0018466 A1 | 1/2006 | Adelstein et al. |
| 2006/0031673 A1 | 2/2006 | Beck et al. |
| 2006/0101516 A1 | 5/2006 | Sudaharan et al. |
| 2006/0136720 A1 | 6/2006 | Armstrong et al. |
| 2006/0242703 A1 | 10/2006 | Abeni |
| 2006/0288414 A1 | 12/2006 | Kuroda |
| 2006/0294592 A1 | 12/2006 | Polyakov et al. |
| 2007/0002689 A1 | 1/2007 | Mateescu et al. |
| 2007/0101431 A1 | 5/2007 | Clift et al. |
| 2007/0180450 A1 | 8/2007 | Croft et al. |
| 2007/0180529 A1 | 8/2007 | Costea et al. |
| 2007/0240221 A1 | 10/2007 | Tuvell et al. |
| 2007/0250930 A1 | 10/2007 | Aziz et al. |
| 2008/0005782 A1 | 1/2008 | Aziz |
| 2008/0016571 A1 | 1/2008 | Chang |
| 2008/0127114 A1 | 5/2008 | Vasudevan |
| 2008/0177994 A1 | 7/2008 | Mayer |
| 2008/0222729 A1 | 9/2008 | Chen et al. |
| 2008/0320594 A1 | 12/2008 | Jiang |
| 2009/0307273 A1 | 12/2009 | Johnson et al. |
| 2010/0042632 A1 | 2/2010 | Johnson et al. |
| 2010/0095281 A1 | 4/2010 | Raber |
| 2010/0153693 A1 | 6/2010 | Stall et al. |
| 2010/0306179 A1 | 12/2010 | Lim |
| 2011/0060947 A1 | 3/2011 | Song et al. |
| 2011/0179136 A1 | 7/2011 | Twitchell |
| 2011/0239291 A1 | 9/2011 | Sotka |
| 2011/0321165 A1 | 12/2011 | Capalik et al. |
| 2011/0321166 A1* | 12/2011 | Capalik ............... H04L 63/1491 726/25 |
| 2012/0167063 A1 | 6/2012 | Detwiler et al. |
| 2012/0174186 A1 | 7/2012 | Aziz et al. |
| 2012/0179904 A1 | 7/2012 | Dunn et al. |
| 2012/0255012 A1 | 10/2012 | Sallam |
| 2012/0255018 A1 | 10/2012 | Sallam |
| 2012/0331553 A1 | 12/2012 | Azizi et al. |
| 2013/0047257 A1 | 2/2013 | Aziz |
| 2013/0238785 A1 | 9/2013 | Hawk et al. |
| 2013/0254870 A1 | 9/2013 | Sotka |
| 2013/0304903 A1 | 11/2013 | Mick et al. |
| 2014/0026121 A1 | 1/2014 | Jackson et al. |
| 2014/0096131 A1 | 4/2014 | Sonneck et al. |
| 2014/0108635 A1 | 4/2014 | Khemani et al. |
| 2014/0108761 A1* | 4/2014 | Escandell ........... G06F 11/3636 711/170 |

OTHER PUBLICATIONS

Capalik, Final Office Action, U.S. Appl. No. 11/788,795, dated Aug. 14, 2014, 18 pgs.
Capalik, Examiner's Answer, U.S. Appl. No. 11/788,795, dated May 31, 2011, 19 pgs.
Capalik, Notice of Allowance, U.S. Appl. No. 11/488,743, dated Oct. 24, 2012, 9 pgs.
Capalik, Notice of Allowance, U.S. Appl. No. 13/759,335, dated Oct. 9, 2013, 10 pgs.
Capalik, Notice of Allowance, U.S. Appl. No. 13/163,590, dated Apr. 10, 2015, 5 pgs.
Capalik, Final Office Action, U.S. Appl. No. 13/163,590, dated Aug. 15, 2014, 11 pgs.
Capalik, Notice of Allowance, U.S. Appl. No. 13/163,590, dated May 1, 2014, 5 pgs.
Capalik, Office Action, U.S. Appl. No. 13/163,590, dated Oct. 25, 2013, 11 pgs.
Capalik, Office Action, U.S. Appl. No. 11/488,743, dated Aug. 4, 2010, 22 pgs.
Capalik, Office Action, U.S. Appl. No. 11/488,743, dated Feb. 16, 2010, 23 pgs.
Capalik, Office Action, U.S. Appl. No. 11/488,743, dated Jan. 18, 2011, 23 pgs.
Capalik, Office Action, U.S. Appl. No. 11/488,743, dated Jul. 30, 2009, 21 pgs.
Capalik, Office Action, U.S. Appl. No. 11/788,795, dated Dec. 1, 2010, 19 pgs.
Capalik, Office Action, U.S. Appl. No. 11/788,795, dated Jun. 9, 2010, 14 pgs.
Capalik, Office Action, U.S. Appl. No. 13/163,578, dated Nov. 1, 2013, 15 pgs.
Capalik, Office Action, U.S. Appl. No. 13/759,335, dated Jun. 14, 2013, 32 pgs.
Capalik, Office Action, U.S. Appl. No. 14/542,376, dated Jul. 23, 2015, 10 pgs.
Capalik, Certificate of Grant, AU2011271157, dated Jan. 7, 2016, 1 pg.
CounterTack Inc., Certificate of Grant, EP08745858.4, dated Aug. 5, 2015, 1 pg.
CounterTack Inc., Extended European Search Report, EP 15174670.8, dated Nov. 11, 2015, 4 pgs.
Dagon et al., "HoneyStat: Local Worm Detection Using Honeypots," Recent Advance in Intrusion Detection, Springer Berlin Heidelberg, 2004, 20 pgs.
Debug Register, Aus Lowlevel, Mar. 22, 2010, 2 pgs.
European Network of Affined Honeypots, D1.2: Attack Detection and Signature Generation, May 11, 2006.
Anonymous, Wikipedia, "Honeypot (Computing)" http://en.wikipedia.org/wiki/Honeypot, Jul. 17, 2006, 4 pgs.
Anonymous, Wikipedia, "Intrusion-Detection System" http://en.wikipedia.org/wiki/Intrusion_detection_system, Jul. 17, 2006, 3 pgs.
ISR, PCT/US08/60336, dated Aug. 11, 2008.

(56) References Cited

OTHER PUBLICATIONS

Joshi, Detecting Past and Present Intrusions Through Vulnerability Specific Predicates, SOSP'05, Brighton, UK, Oct. 23-26, 2005, 14 pgs.
Krapf, XEN memory management, Oct. 30, 2007, 5 pgs.
Liang, Fast and Automated Generation of Attach Signatures: A Basis for Building Self-Protecting Servers, Nov. 7-11, 2005.
Litty, Hypervisor support for identifying covertly executing binaries, Dec. 31, 2008, 16 pgs.
NeuralIQ Inc., Decision to Grant a Patent, JP 2010-504185, dated Jul. 26, 2013, 1 pg.
NeuralIQ Inc., Extended European Search Report, 08745858-4, dated Jun. 12, 2014, 4 pgs.
NeuralIQ Inc., International Search Report/Written Opinion, PCT/US2011/041119, dated Oct. 4, 2011, 12 pgs.
NeuralIQ Inc., International Search Report/Written Opinion, PCT/US2011/041122, dated Sep. 21, 2011, 12 pgs.
NeuralIQ Inc., Notice of Reasons for Rejection, JP 2010-504185, dated Mar. 15, 2013, 4 pgs.
NeuralIQ Inc., Office Action, AU 2008242296, dated Apr. 5, 2012, 2 pgs.
NeuralIQ Inc., Examination Report, AU2011271157, dated Mar. 13, 2015, 4 pgs.
NeuralIQ Inc., Office Action, CA 2,689,126, dated Aug. 15, 2012, 3 pgs.
NeuralIQ Inc., Office Action, CA 2,689,126, dated Jan. 23, 2014, 3 pgs.
NeuralIQ Inc., Office Action, CA 2,689,126, dated Mar. 6, 2015, 3 pgs.
NeuralIQ Inc., Patent Examination Report No. 1, AU 2011271157, dated Dec. 16, 2013, 4 pgs.
Provos, A Virtual Honeypot Framework, Oct. 21, 2003, 11 pgs.
Shibuya, A study for some experiences of the Operation of Highly Interactive Decoy System, Aug. 10, 2004, 10 pgs.
Tian, A Study of Intrusion Signature Based on Honeypot, Parallel and Distributed Computing, Applications and Technologies, PDCAT'2005, Dec. 8, 2005, pp. 125-129.
Zhang, Honeypot: a supplemented active defense system for network security, Parallel and Distributed Computing, Applications and Technologies, PDCAT'2003, Aug. 29, 2003, pp. 231-235.
Capalik, Office Action, U.S. Appl. No. 14/542,376, dated Jun. 22, 2016, 13 pgs.
CounterTack Inc., International Search Report and Written Opinion, PCTUS2016/012533, dated Jun. 16, 2016, 12 pgs.
Capalik, Office Action, U.S. Appl. No. 14/823,916, dated Aug. 30, 2016, 13 pgs.
CounterTack Inc., Decision to Grant, EP15174670.8, dated Sep. 14, 2016, 5 pgs.
CounterTack Inc., Certificate of Grant, EP15174670.8, dated Sep. 14, 2016, 1 pg.
Capalik, Final Office Action, U.S. Appl. No. 14/542,376, dated Apr. 24, 2017, 17 pgs.
Capalik, Final Office Action, U.S. Appl. No. 14/823,916, dated Jun. 6, 2017, 15 pgs.
CounterTack Inc., Communication Pursuant to Article 94(3), EP11729826.5, dated Jun. 22, 2017, 5 pgs.
CounterTack Inc., Office Action, CA 2,689,126, dated Jun. 2, 2017, 3 pgs.
Capalik, Notice of Allowance, U.S. Appl. No. 14/823,916, dated Dec. 15, 2017, 7 pgs.
CounterTack Inc., Intent to Grant, EP11731194.4, dated Jul. 20, 2017, 6 pgs.
CounterTack Inc., Decision to Grant, EP11731194.4, dated Jan. 11, 2018, 1 pg.
CounterTack Inc., Certificate of Grant, EP11731194.4, dated Feb. 7, 2018, 1 pg.
CounterTack Inc., International Preliminary Report on Patentability, PCTUS2016/012533, dated Jul. 11, 2017, 8 pgs.
CounterTack Inc., Notice of Allowance, CA 2,689,126, dated Feb. 1, 2018, 1 pg.

\* cited by examiner

502 Receive machine interpretable code that is configured for interpretation by the interpreter. The machine interpretable code is not directly executable by the one or more processors. The machine interpretable code includes: information identifying a first set of one or more monitoring targets within the collector computer system, a method for monitoring the first set of one or more monitoring targets, and predefined reporting criteria.

504 The machine interpretable code is in a script language

506 The first set of one or more monitoring targets includes one or more of: one or more applications running on the collector computer system, one or more types of operations or services within the collector computer system, one or more regions of the memory, one or more registry entries, one or more network connection points, one or more mutex objects, and one or more memory operations

508 The predefined reporting criteria include types of information for reporting, the types of information including one or more of: a timestamp, one or more file names associated with the candidate activity, one or more process names associated with the candidate activity, one or more network connection points, one or more registry paths, one or more mutex objects, one or more library names, and one or more thread numbers and/or process numbers.

510 Interpret the machine interpretable code with the interpreter to obtain the first set of one or more monitoring targets, the method for monitoring the first set of one or more monitoring targets, and the predefined reporting criteria

512 The interpreter is located within the kernel and interpreting the machine interpretable code is performed without rebooting the collector computer system subsequent to receiving the machine interpretable code (A)

Figure 5A

616 Subsequent to sending to the collector computer system the machine interpretable code, receive from the collector computer system candidate event information that is associated with a candidate activity with the first set of one or more monitoring targets 618 Subsequent to receiving the information, send to the collector computer system instructions to terminate the candidate activity on the collector computer system 620 The machine interpretable code is sent for the collector computer system operating in a first state. For the collector computer system operating in a second state that is distinct from the first state, send machine executable code that is configured for execution by the one or more processors of the collector computer system and that is not configured for interpretation by the interpreter, wherein the machine executable code includes information identifying a second set of one or more monitoring targets and second predefined reporting criteria; and, subsequent to sending to the collector computer system the machine executable code, receive additional candidate event information that is associated with the second set of one or more monitoring targets and that satisfies the second predefined reporting criteria

Figure 6B

SYSTEM AND METHOD FOR MONITORING A COMPUTER SYSTEM USING MACHINE INTERPRETABLE CODE

RELATED APPLICATIONS

This application claims the benefit of, and priority to, U.S. Provisional Application Ser. No. 62/100,797, filed Jan. 7, 2015, entitled "System and Method for Detecting Unauthorized Activities on a Computer System Using Machine Interpretable Code," which is incorporated by reference herein in its entirety.

This application is related to U.S. patent application Ser. No. 13/163,590, filed Jun. 17, 2011, entitled "System and Method for Identifying Unauthorized Activities on a Computer System Using a Data Structure Model," which claims priority to U.S. Provisional Application Ser. No. 61/358,367, entitled "System and Method for Identifying Unauthorized Activities on a Computer System Using a Data Structure Model" filed on Jun. 24, 2010, both of which are incorporated by reference herein in their entireties.

TECHNICAL FIELD

This application relates generally to systems and methods for monitoring computer networks, including but not limited to systems and methods for monitoring one or more computer systems over computer networks.

BACKGROUND

An increasing number of computers are connected to computer networks (e.g., the Internet). Networked computers provide a significant benefit of accessing and sharing data over the networks. However, these networked computers are also vulnerable to attacks, unwanted intrusions, and unauthorized access.

Certain existing network security systems have been developed to protect computers from attacks, unwanted intrusions, unauthorized access, and other malicious activities. Such network security systems typically include a firewall to prevent unauthorized access to the network or its computers. Exemplary network security systems also include intrusion detection systems (IDS) and intrusion prevention systems (IPS) that typically contain a library of malware fingerprints (e.g., fingerprints of malware payloads and other unauthorized activities). By using the malware fingerprints, the IDS or the IPS can detect attempts to access computer systems without authorization. When a connection is attempted to a network port, the IDS or IPS examines the low-level IP data packets and compares them to its library of fingerprints for a match. When a match is identified, the IDS or IPS provides notification of the match and/or prevents further access. Therefore, the malware fingerprints play a critical role in network security.

A critical threat to computer networks is the so-called zero-day attack that exploits security vulnerabilities previously unknown to software developers or system operators. Because the security vulnerabilities are unknown to the software developers or system operators, often the fingerprints of such zero-day attacks are unavailable for comparison. Until the fingerprints are identified, attacks exploiting the same security vulnerabilities continue without detection by the network security systems. However, identifying the fingerprints of malicious activities in the middle of numerous other non-malicious processes is not a trivial task.

In addition, malicious processors can be better detected at a low level in a computer system (e.g., within an operating system of the computer system). However, distributing detection tools that operate at a low level in computer systems are challenging, because any errors in the detection tool operation at the low level of the computer system may cause a system failure or crash. In addition, distribution of a detection tool that operates at a low level often requires rebooting the computer system, which is not suitable for computer systems that require continuous and uninterrupted operations.

Thus, there is a great need for improved methods of distributing detection tools for detecting malicious activities on computer systems. In addition, there is a great need for improved methods for monitoring computer systems for other purposes, such as monitoring the performance of computer systems, monitoring the performance of particular software applications on computer systems, and debugging software applications.

SUMMARY

A number of embodiments that address the limitations and disadvantages described above are presented in more detail below. These embodiments provide improved methods and systems for monitoring a computer system.

As described in more detail below, some embodiments involve a computer-implemented method performed at a collector computer system having one or more processors and memory storing one or more programs an interpreter and compiled instructions for execution by the one or more processors. The method includes receiving machine interpretable code that is configured for interpretation by the interpreter. The machine interpretable code is not directly executable by the one or more processors and the machine interpretable code includes: information identifying a first set of one or more monitoring targets within the collector computer system, a method for monitoring the first set of one or more monitoring targets, and predefined reporting criteria. The method also includes interpreting the machine interpretable code with the interpreter to obtain the first set of one or more monitoring targets, the method for monitoring the first set of one or more monitoring targets, and the predefined reporting criteria. The method further includes monitoring, using the one or more processors, at least a subset of the first set of one or more monitoring targets for candidate activity that satisfies the predefined reporting criteria by executing compiled instructions that correspond to the method for monitoring the first set of one or more monitoring targets; obtaining candidate event information that is associated with the candidate activity; and reporting the candidate event information to a computer system that is distinct from the collector computer system.

In accordance with some embodiments, a collector computer system includes one or more processors; and memory storing one or more programs that include an interpreter and compiled instructions. The one or more programs, when executed by the one or more processors, cause the collector computer system to perform the above-described method.

In accordance with some embodiments, a non-transitory computer readable storage medium, stores one or more programs that include an interpreter and compiled instructions for execution by one or more processors of a collector computer system. The one or more programs include instructions for performing the above-described method.

In accordance with some embodiments, a collector computer system includes one or more processors; and memory storing one or more programs that include an interpreter and compiled instructions. The one or more programs, when executed by the one or more processors, cause the collector computer system to receive machine interpretable code that is configured for interpretation by the interpreter. The machine interpretable code is not directly executable by the one or more processors and the machine interpretable code includes: information identifying a first set of one or more monitoring targets within the collector computer system, a method for monitoring the first set of one or more monitoring targets, and predefined reporting criteria. The one or more programs also cause the collector computer system to interpret the machine interpretable code with the interpreter to obtain the first set of one or more monitoring targets, the method for monitoring the first set of one or more monitoring targets, and the predefined reporting criteria; monitor, using the one or more processors, at least a subset of the first set of one or more monitoring targets for candidate activity that satisfies the predefined reporting criteria by executing compiled instructions that correspond to the method for monitoring the first set of one or more monitoring targets; obtain candidate event information that is associated with the candidate activity; and report the candidate event information to a computer system that is distinct from the collector computer system.

In accordance with some embodiments, a non-transitory computer readable storage medium, storing one or more programs that include an interpreter and compiled instructions for execution by one or more processors of a collector computer system. The one or more programs include instructions for receiving machine interpretable code that is configured for interpretation by the interpreter. The machine interpretable code is not directly executable by the one or more processors and the machine interpretable code includes: information identifying a first set of one or more monitoring targets within the collector computer system, a method for monitoring the first set of one or more monitoring targets, and predefined reporting criteria. The one or more programs also include instructions for interpreting the machine interpretable code with the interpreter to obtain the first set of one or more monitoring targets, the method for monitoring the first set of one or more monitoring targets, and the predefined reporting criteria; monitoring, using the one or more processors, at least a subset of the first set of one or more monitoring targets for candidate activity that satisfies the predefined reporting criteria by executing compiled instructions that correspond to the method for monitoring the first set of one or more monitoring targets; obtaining candidate event information that is associated with the candidate activity; and reporting the candidate event information to a computer system that is distinct from the collector computer system.

In accordance with some embodiments, a computer implemented method of monitoring a collector computer system by one or more controller computer system involves at least a controller computer system comprising one or more processors and memory storing instructions for execution by the one or more processors. The method includes sending to the collector computer system machine interpretable code that is configured for interpretation by an interpreter stored within the collector computer system. The machine interpretable code is not directly executable by one or more processors of the collector computer system and the machine interpretable code includes information identifying a first set of one or more monitoring targets within the collector computer system, a method for monitoring the first set of one or more monitoring targets by the collector computer system, and predefined reporting criteria. The method also includes, subsequent to sending to the collector computer system the machine interpretable code, receiving from the collector computer system candidate event information that is associated with a candidate activity with the first set of one or more monitoring targets. In some embodiments, the method includes sending to a group of collector computer systems the machine interpretable code and receiving from the group of collector computer systems the candidate event information.

In accordance with some embodiments, a controller computer system includes one or more processors; and memory storing one or more programs, which, when executed by the one or more processors, cause the controller computer system to perform the above-described method.

In accordance with some embodiments, a non-transitory computer readable storage medium stores one or more programs execution by one or more processors of a controller computer system. The one or more programs include instructions for performing the above-described method.

In accordance with some embodiments, a controller computer system includes one or more processors; and memory storing one or more programs, which, when executed by the one or more processors, cause the controller computer system to: send to the collector computer system machine interpretable code that is configured for interpretation by an interpreter stored within the collector computer system. The machine interpretable code is not directly executable by one or more processors of the collector computer system and the machine interpretable code includes information identifying a first set of one or more monitoring targets within the collector computer system, a method for monitoring the first set of one or more monitoring targets by the collector computer system, and predefined reporting criteria. The one or more programs also cause the controller computer system to, subsequent to sending to the collector computer system the machine interpretable code, receive from the collector computer system candidate event information that is associated with a candidate activity with the first set of one or more monitoring targets. In some embodiments, the one or more programs cause the controller computer system to send to a group of collector computer systems the machine interpretable code and receive from the group of collector computer systems the candidate event information.

In accordance with some embodiments, a non-transitory computer readable storage medium stores one or more programs execution by one or more processors of a controller computer system. The one or more programs include instructions for: sending to the collector computer system machine interpretable code that is configured for interpretation by an interpreter stored within the collector computer system. The machine interpretable code is not directly executable by one or more processors of the collector computer system and the machine interpretable code includes information identifying a first set of one or more monitoring targets within the collector computer system, a method for monitoring the first set of one or more monitoring targets by the collector computer system, and predefined reporting criteria. The one or more programs also include instructions for, subsequent to sending to the collector computer system the machine interpretable code, receiving from the collector computer system candidate event information that is associated with a candidate activity with the first set of one or more monitoring targets. In some embodiments, the one or more programs cause the controller computer system to send to a group of collector computer systems the machine interpretable code and receive from the group of collector computer systems the candidate event information.

In accordance with some embodiments, a group of controller computer systems collectively includes multiple processors; and memory storing one or more programs, which, when executed by at least a subset of the multiple processors, cause the group of controller computer systems to: send to the collector computer system machine interpretable code that is configured for interpretation by an interpreter stored within the collector computer system. The machine interpretable code is not directly executable by one or more processors of the collector computer system and the machine interpretable code includes information identifying a first set of one or more monitoring targets within the collector computer system, a method for monitoring the first set of one or more monitoring targets by the collector computer system, and predefined reporting criteria. The one or more programs also cause the group of controller computer systems to, subsequent to sending to the collector computer system the machine interpretable code, receive from the collector computer system candidate event information that is associated with a candidate activity with the first set of one or more monitoring targets. In some embodiments, the one or more programs cause the group of controller computer systems to send to a group of collector computer systems the machine interpretable code and receive from the group of collector computer systems the candidate event information. An exemplary group of controller computer systems includes a first computer system dedicated for sending machine interpretable code and a second computer system dedicated for receiving the candidate event information. For example, an IDS/IPS can be used for receiving the candidate event information.

In some embodiments, these embodiments are used to identify unauthorized activities (also called herein malicious activities). The data (e.g., the candidate event information) collected by these embodiments can be used to generate fingerprint data in response to the zero-day attacks (e.g., to prevent future attacks). Details of such methods and systems are described in U.S. patent application Ser. No. 13/163,590, filed Jun. 17, 2011, entitled "System and Method for Identifying Unauthorized Activities on a Computer System Using a Data Structure Model," which is incorporated by reference herein in its entirety. In some embodiments, the above-described embodiments are used to monitor a computer system (e.g., a collector computer system) or a group of computer systems (e.g., a group of collector computer systems) in general.

The described embodiments provide computer systems and methods for monitoring a collector computer system by using machine interpretable code (e.g., based on a script language). Because information extracted from the machine interpretable code is used with a verified set of compiled instructions, the risk of a system failure or crash is reduced. Thus, the described computer systems and methods allow software developers to test various monitoring parameters without causing system failures or crashes, which is particularly advantageous for developing applications on production systems (e.g., computer systems that are accessed by users for practical applications, and not for testing purposes only). Once a certain set of monitoring parameters is selected, the selected set of monitoring parameters can be included in executable instructions for subsequent distribution, thereby improving the performance in monitoring a collector computer system (e.g., the monitoring operation is performed faster or less computer resources are required for the monitoring operation). In some cases, the code in the script language is compiled and then converted to computer executable instructions, which further facilitates generation of the executable instructions.

BRIEF DESCRIPTION OF THE DRAWINGS

For a better understanding of the aforementioned aspects as well as additional aspects and embodiments, reference should be made to the Description of Embodiments below, in conjunction with the following drawings in which like reference numerals refer to corresponding parts throughout the figures.

FIGS. 5A-5B are flowcharts representing a method of monitoring a collector computer system, in accordance with some embodiments.

FIGS. 6A-6B are flowcharts representing a method of monitoring a collector computer system by a controller computer system, in accordance with some embodiments.

DESCRIPTION OF EMBODIMENTS

Embodiments of various systems and methods for monitoring computer systems are described below. Reference will be made to certain embodiments, examples of which are illustrated in the accompanying drawings. While the invention will be described in conjunction with certain embodiments, it should be understood that these particular embodiments are not intended to limit the invention. Instead, the claims are intended to cover alternatives, modifications and equivalents that are within the spirit and scope of the principles described herein. Moreover, in the following description, numerous specific details are set forth to provide a thorough understanding of these embodiments. However, it will be apparent to one of ordinary skill in the art that the embodiments described herein may be practiced without these particular details. In other instances, methods, procedures, components, and networks that are well-known to those of ordinary skill in the art are not described in detail to avoid obscuring aspects of the described embodiments.

Figure 1:
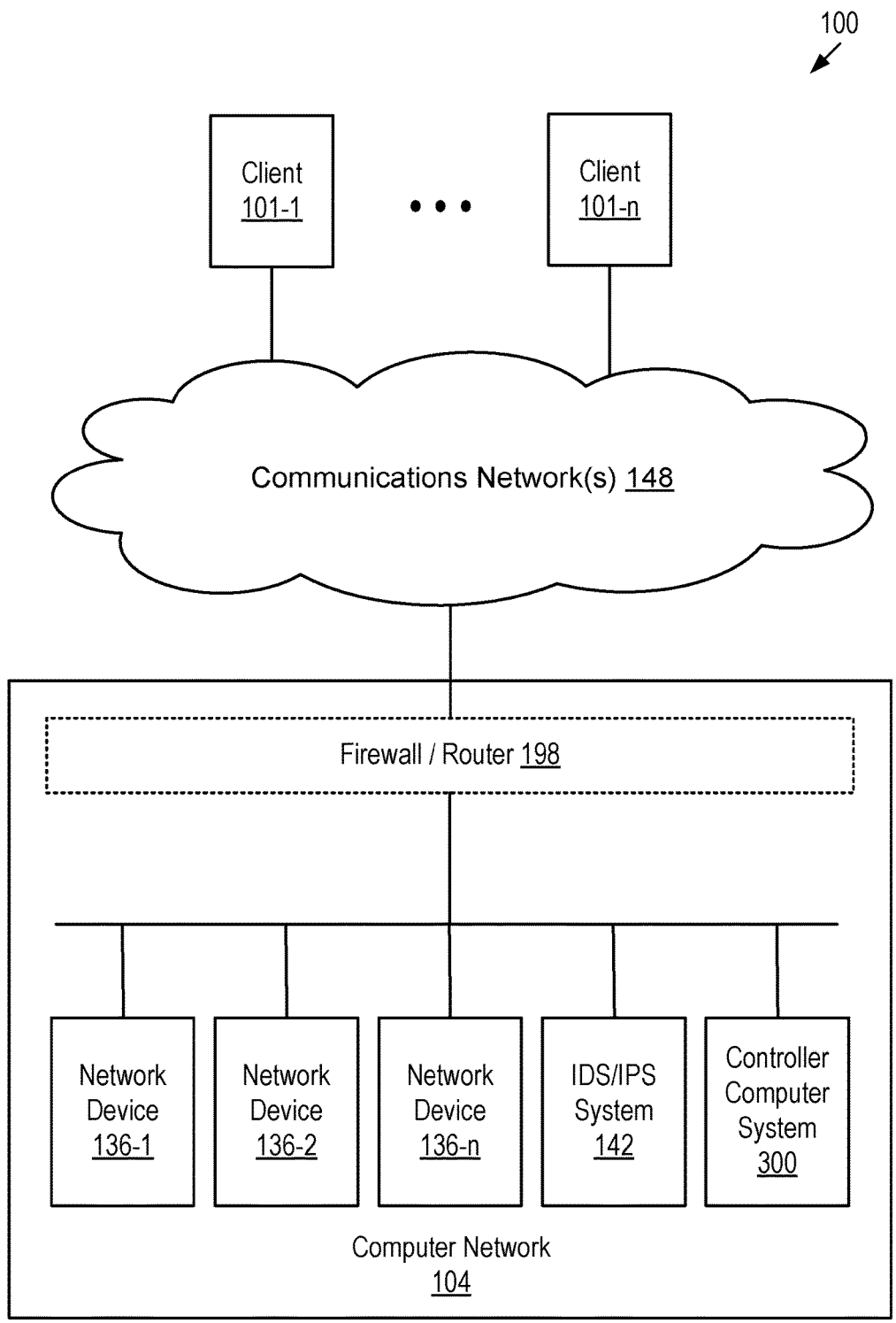
FIG. 1 is a high-level block diagram illustrating an exemplary distributed computer system in accordance with some embodiments.

FIG. 1 illustrates an exemplary distributed computer system 100, according to some embodiments. The system 100 includes a communications network 148 and a computer network 104. Various embodiments of the computer network 104 implement the methods (e.g., methods for monitoring a computer system) described in this document.

In some embodiments, the systems on the computer network 104 are accessed by client computers 101. The client computers 101 can be any of a number of computing devices (e.g., desktop computer, laptop computer, Internet kiosk, personal digital assistant, cell phone, gaming device, handheld computer, or combinations thereof) used to enable the activities described below. The client computer(s) 101 are also referred to herein as client(s). In some embodiments, the client(s) 101 are connected to network devices 136 (e.g., 136-1, 136-2, and 136-*n*) via the communications network 148 (e.g., some of the network devices 136 are web servers that provide web services to the clients 101).

The network devices 136 may include any of a number of computing devices (e.g., server computers, desktop computer, laptop computer, Internet kiosk, personal digital assistant, cell phone, gaming device, handheld computer, or combinations thereof). In some embodiments, the network devices 136 include one or more virtual machines on a computing device. The network devices 136-1 through 136-n are accessible from the network 148 by one or more authorized users using the clients 101 (e.g., the network devices can be servers providing services for webpages, email, files, web applications, etc.). Typically, the computer network 104 includes a firewall/router 198 to prevent unauthorized accesses to the network devices 136 and route network traffic to and from the network devices 136, as illustrated in FIG. 1. Alternatively, the firewall/router 198 can protect only certain devices/systems in the computer network 104 (e.g., the IDS/IPS system 142 and/or the controller computer system 300).

In some embodiments, the computer network 104 also includes an IDS/IPS system 142 (intrusion detection and prevention system). The IDS/IPS system 142 includes, or has access to, one or more fingerprint libraries. The fingerprint libraries include fingerprints of unauthorized activities. The IDS/IPS system 142 identifies unauthorized activities based on the fingerprints stored in the fingerprint library, and provides notification to a user or a system administrator, and/or prevents unauthorized activities matching the stored fingerprints by modifying the network devices 136 and/or the firewall/router 198. Suitable IDS/IPS systems 142 include Cisco Systems' IPS 4200 Series, Juniper's IDP 200, and Enterasys' Dragon IDS Network Sensor.

As explained above, in some embodiments, the IDS/IPS system 142 is coupled to the firewall/router 198 such that the IDS/IPS system can reconfigure the firewall/router 198 to protect the network devices 136 in the computer network 104 from attacks. In some embodiments, the IDS/IPS and the firewall are located in a single combined device.

In some embodiments, the computer network 104 includes a controller computer system 300. The controller computer system 300 provides to one or more network devices 136 information used for monitoring their activities. In some embodiments, the controller computer system 300 is included in the IDS/IPS system 142. In some embodiments, the controller computer system 300 is located outside the computer network 104 (e.g., in a computer network distinct from the computer network 104). Details of the controller computer system 300 are described further with respect to FIG. 3.

In some embodiments, one or more of the network devices 136 operate as collector network device(s). In some embodiments, all of the network devices 136 operate as collector network devices. A collector network device is a computer system that is monitored to collect event information (e.g., information of unauthorized or malicious activities). In some embodiments, the collector network device is intentionally kept vulnerable to unauthorized or malicious activities (e.g., known security weaknesses may be intentionally left unfixed or unpatched, and/or other security components, such as firewalls, are intentionally not installed). Such devices do not contain valuable data, and thus, the risk of losses associated with having attacks on such devices is low. On the other hand, draw attacks on the devices can generate valuable fingerprints, which can be used to prevent future attacks. In other embodiments, the collector network device includes security devices and software applications like other network devices (e.g., the collector network device may be protected by the firewall/router 198 and any other security measures included in the network devices 136). One of the purposes of the collector network device is to monitor attacks on the collector network device, so that the pattern of the attack can be collected and analyzed to generate a fingerprint. This fingerprint of the attack can be used to prevent similar attacks on the collector network device and/or other computers (e.g., other network devices 136).

Attackers can initiate attacker activities over the communications network(s) 148 on the computer network 104. Ideally, the firewall/router 198 or security software on the network devices 136 will protect the network devices 136 from at least some of the attacker activity(s). In some embodiments, a collector network device is exposed to the attacker activity(s) in order to attract the attacks. In some embodiments, the collector network device (e.g., the network device 136-1) is protected by the firewall/router 198 and/or security software. In some embodiments, all of the network devices 136 are used as collector network devices.

Although FIG. 1 illustrates that the controller computer system 300 is located within the computer network 104, in some embodiments, the controller computer system 300 is located outside the computer network 104. For example, the computer network 104 may be a corporate computer network for Company A. In some embodiments, the controller computer system 300 is located within the corporate computer network for Company A. In some embodiments, the controller computer system 300 may be located in a corporate computer network for Company B that is distinct from Company A. In some embodiments, the controller computer system 300 is located at a computer security service provider (e.g., a network security service company). In some embodiments, the controller computer system 300 (e.g., at a network security service company) receives candidate event information from a network device 136 in the corporate computer network for Company A, and provides update instructions to network devices in the corporate computer network for Company A and/or other computer networks.

Figure 2:
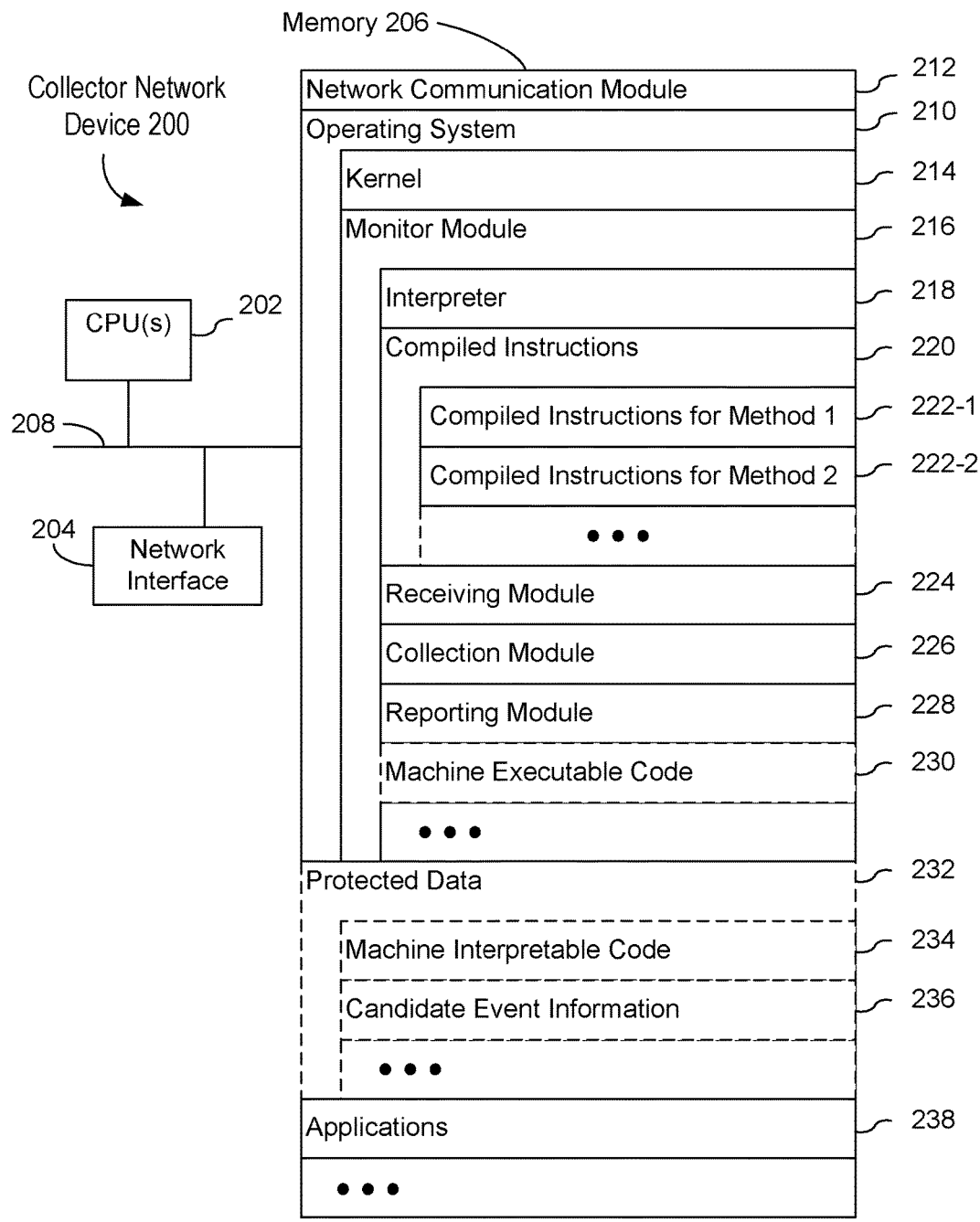
FIG. 2 is a block diagram illustrating a collector network device, in accordance with some embodiments.

FIG. 2 is a block diagram illustrating a collector network device 200 in accordance with some embodiments. The collector network device 200 is also referred to herein a collector computer system. In some embodiments, a collector network device 200 is implemented in any of the network devices 136 in FIG. 1. The collector network device 200 typically includes one or more processing units (CPUs) 202 (also called herein processors), one or more network or other communications interfaces 204, memory 206, and one or more communication buses 208 for interconnecting these components. In some embodiments, the communication buses 208 include circuitry (sometimes called a chipset) that interconnects and controls communications between system components. In some other embodiments, the collector network device 200 includes a user interface (not shown) (e.g., a user interface having a display device, a keyboard, and a mouse or other pointing device), but when implemented as a server, the collector network device 200 is typically controlled from and accessed via various client systems (e.g., the client 101 in FIG. 1; and more typically, a client connected through a secure private network).

The memory 206 of the collector network device 200 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the CPU(s) 202. The memory 206, or alternately the non-volatile memory device(s) within the memory 206, comprises a non-transitory computer readable storage medium. The memory 206 or the computer readable storage medium of the memory 206 stores one or more of the following programs:

- a network communication module (or instructions) 212 that is used for connecting the collector network device 200 to computer networks (e.g., communication network(s) 148, collector computer network 102, and computer network 104), and/or other computers (e.g., the client 101) via the one or more communications interfaces 204 and one or more communications networks 148, such as the Internet, a wireless network (e.g., Wi-Fi, WiMAX, 3 G, 4 G, etc.), any local area network (LAN), wide area network (WAN), metropolitan area network, or a combination of such networks;
- an operating system 210 that includes procedures for handling various basic system services and for performing hardware dependent tasks;
- protected data 232 that is typically accessible by preselected modules, such as modules in the operating system 210 (e.g., kernel 214 and/or monitor module 216); and
- one or more applications 238, such as client applications (e.g., a web browser, a word processing software, and a movie player), server applications (e.g., database applications, services applications, etc.), and/or security applications (e.g., packet analysis software application, etc.).

In some embodiments, the operating system 210 includes one or more of the following:

- a kernel 214 that typically manages input output requests from the one or more applications 238 and sends data processing instructions to the one or more processors 202; and
- a monitor module 216 that monitors the collector network device 200 (e.g., for malicious activity).

Although the monitor module 216 and the kernel 214 are shown as separate modules in FIG. 2, in some embodiments, the monitor module 216 is embedded in the kernel 214. In some embodiments, the kernel 214 includes a portion of the monitor module 216 and does not include a remaining portion of the monitor module 216.

In some embodiments, the monitor module 216 includes one or more of the following:

- an interpreter 218 that (i) converts one or more non-executable instructions in machine interpretable code (e.g., machine interpretable code 234) into machine executable instructions, (ii) performs operations specified in the one or more non-executable instructions by identifying machine executable instructions that correspond to the one or more non-executable instructions; or (iii) obtains (or extracts) information stored in the machine interpretable code;
- compiled instructions 220 that include machine code configured for execution by the one or more processing units 202 without further use of a compiler or an interpreter;
- receiving module 224 that receives machine interpretable code and/or machine executable code from another computer system (e.g., a network device 136 of FIG. 1);
- collection module 226 that obtains candidate event information associated with a candidate activity, optionally in accordance with predefined reporting criteria;
- reporting module 228 that reports the candidate event information to another computer system (e.g., the controller computer system 300, the IDS/IPS system 142 and/or network devices 136 of FIG. 1); and
- machine executable code 230, which includes machine code configured for execution by the one or more processing units 202 without further use of a compiler or an interpreter. In some embodiments, the machine executable code 230 is distinct from the compiled instructions 220.

In some embodiments, the compiled instructions 220 include a plurality of sets of instructions, such as a first set of instructions 222-1 that corresponds to a first method (e.g., monitoring all calls that request creation of a new file) and a second set of instructions 222-2 that is distinct from the first set of instructions 222-1 and that corresponds to a second method (e.g., monitoring all calls that request launching a particular application) that is distinct from the first method.

Although the compiled instructions 220 are shown as part of the monitor module 216 in FIG. 2, in some embodiments, the compiled instructions 220 are included in the protected data 232.

In some embodiments, the protected data 232 includes one or more of the following:

- machine interpretable code 234, which typically includes information identifying one or more of: one or more monitoring targets within the collector computer system, a method for monitoring the first set of one or more monitoring targets, and predefined reporting criteria;
- candidate event information 236, which includes one or more of: a timestamp, one or more file names associated with the candidate activity, one or more process names associated with the candidate activity, one or more network connection points, one or more registry paths, one or more mutex objects, one or more library names, and one or more thread numbers and/or process numbers; and
- other protected data, such as access-controlled information (e.g., user information, financial records, private records, etc.).

In some embodiments, the machine interpretable code 234 is in a script language.

In some embodiments, the candidate event information 236 also include information identifying associations between candidate activities. Such data structures are described in detail in U.S. patent application Ser. No. 13/163,590, filed Jun. 17, 2011, which is incorporated by reference herein in its entirety.

Each of the above identified modules, components, and applications in FIG. 2 corresponds to a set of instructions for performing one or more functions described herein. These modules (i.e., sets of instructions) need not be implemented as separate software programs, procedures or modules, and thus various subsets of these modules may be combined or otherwise re-arranged in various embodiments. In some embodiments, the memory 206 may store a subset of the modules and data structures identified above. Furthermore, the memory 206 may store additional modules and data structures not described above.

Figure 3:
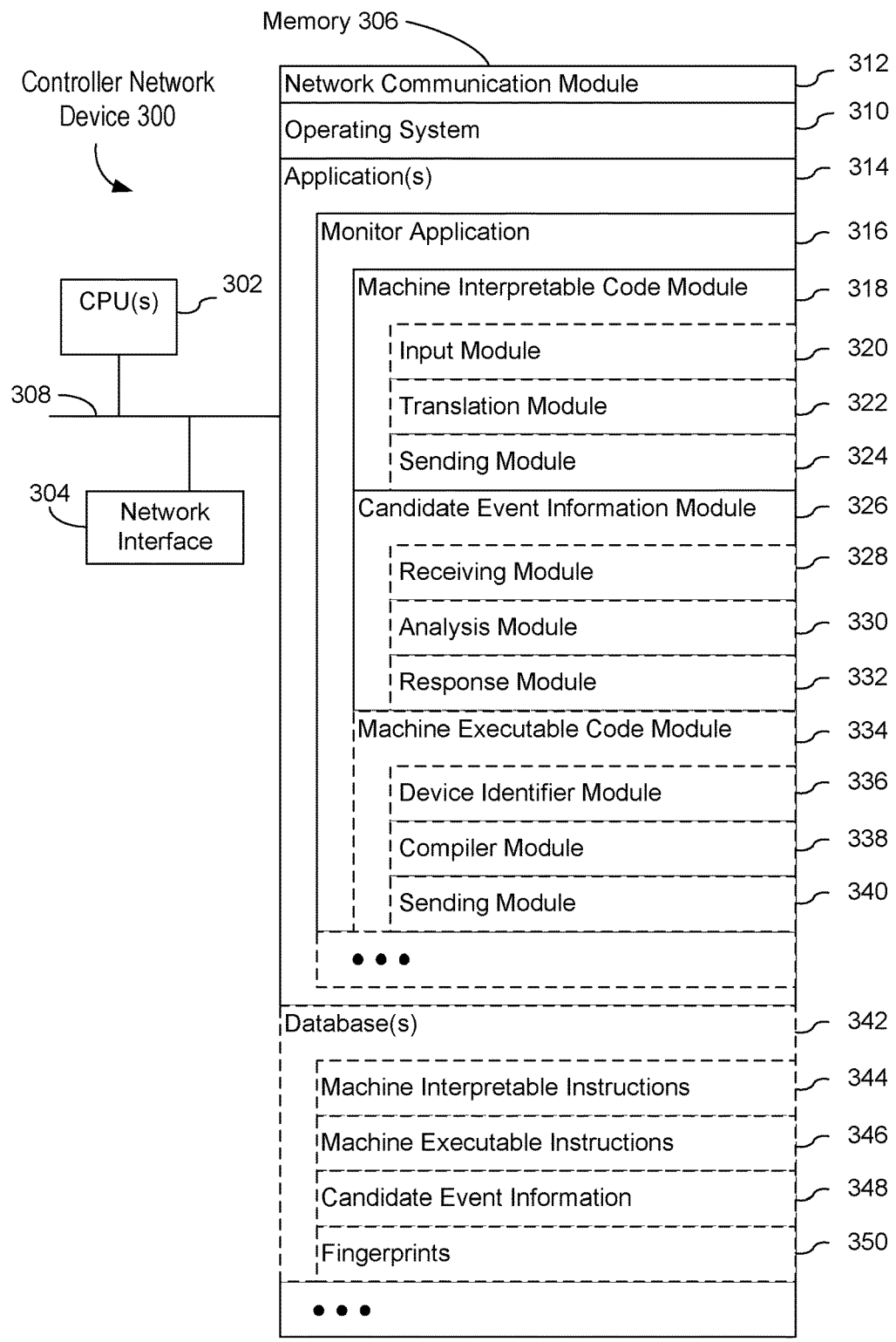
FIG. 3 is a block diagram illustrating a controller network device, in accordance with some embodiments.

FIG. 3 is a block diagram illustrating a controller network device 300, in accordance with some embodiments. The controller network device 300 is also called herein a controller computer system. In some embodiments, the controller network device 300 is implemented in the IDS/IPS system 142 (FIG. 1). In some embodiments, the controller network device 300 is distinct and separate from the IDS/IPS system 142. In some embodiments, the controller network device 300 is implemented in a network device 136 (FIG. 1). In some embodiments, the controller network device 300 is distinct and separate from a network device 136 as shown in FIG. 1.

The controller network device 300 typically includes one or more processing units (CPUs) 302 (also called herein processors), one or more network or other communications interfaces 304, memory 306, and one or more communication buses 308 for interconnecting these components. In some embodiments, the communication buses 308 include circuitry (sometimes called a chipset) that interconnects and controls communications between system components. In some other embodiments, the controller network device 300 includes a user interface (not shown) (e.g., a user interface having a display device, a keyboard, and a mouse or other pointing device), but when implemented as a server, the controller network device 300 is more typically controlled from and accessed by various client systems (e.g., the client 101 in FIG. 1; and more typically, a client connected through a secure private network).

The memory 306 of the controller network device 300 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 302. The memory 206, or alternately the non-volatile memory device(s) within the memory 306, comprises a non-transitory computer readable storage medium. The memory 306 or the computer readable storage medium of the memory 306 stores one or more of the following programs:

the network communication module (or instructions) 312 that is used for connecting the controller network device 300 to computer networks (e.g., communication network(s) 148, and computer network 104), and/or other computers (e.g., network devices 136 and/or the client 101) via the one or more communications interfaces 304 and one or more communications networks 148, such as the Internet, a wireless network (e.g., Wi-Fi, WiMAX, 3 G, 4 G, etc.), any local area network (LAN), wide area network (WAN), metropolitan area network, or a combination of such networks;

the operating system 310 that includes procedures for handling various basic system services and for performing hardware dependent tasks;

one or more applications 314 that include a monitor application 316, and optionally additional application(s); and one or more databases 342.

In some embodiments, the monitor application 316 includes one or more of the following:

a machine interpretable code module 318 that sends machine interpretable code to one or more collector computer systems 200;

a candidate event information module 326 that receives candidate event information from one or more collector computer systems 200; and a machine executable code module 334 that sends machine executable code to one or more collector computer systems 200.

In some embodiments, the machine interpretable code module 318 includes one or more of the following:

an input module 320 that receives human interpretable instructions (e.g., instructions in a script language, such as Python) as a file or through an input device, such as a keyboard;

a translation module 322 that translates the human interpretable instructions to machine interpretable code (e.g., translating code in Python to instructions in extensible markup language (XML) or Protocol Buffers); and a sending module 324 that sends the machine interpretable code to one or more collector computer systems 200.

In some embodiments, the candidate event information module 326 includes one or more of the following:

a receiving module 328 that receives candidate event information from one or more collector computer systems 200;

an analysis module 330 that analyzes the candidate event information from the one or more collector computer systems 200; and a response module 332 that provides instructions to a collector computer system 200 so that the collector computer system 200 can respond to an activity on the collector computer system 200 (e.g., deleting a file, deleting a registry entry, stopping a process, etc.).

In some embodiments, the machine executable code module 334 includes one or more of the following:

a device identifier module 336 that receives an identification of a collector computer system 200 (e.g., a type of a machine for the collector computer system 200, a type of a processor of the collector computer system 200, a type of an operating system running on collector computer system 200, etc.);

a compiler module 338 that provides machine executable code that is executable by a processor of the collector computer system 200 by either compiling non-executable instructions for the collector computer system 200 or identifying the machine executable code that is executable by a processor of the collector computer system 200 based on the identification of the collector computer system; and a sending module 340 that sends the machine executable code that is executable by a processor of the collector computer system 200.

In some embodiments, the one or more databases 342 include one of more of the following:

machine interpretable instructions 344, which typically includes a collection of machine interpretable instructions sent to one or more collector computer systems 200;

machine executable instructions 346, which typically includes a collection of machine executable code sent to one or more collector computer systems 200;

candidate event information 348 that has been received from one or more collector computer systems 200; and fingerprint 350 that typically includes a set of characteristics of unauthorized activities.

Each of the above identified modules, components, and applications in FIG. 3 corresponds to a set of instructions for performing one or more functions described herein. These modules (i.e., sets of instructions) need not be implemented as separate software programs, procedures or modules, and thus various subsets of these modules may be combined or otherwise re-arranged in various embodiments. In some embodiments, the memory 306 may store a subset of the modules and data structures identified above. Furthermore, the memory 306 may store additional modules and data structures not described above.

The actual number of computer systems used to implement the controller network device 300 and how features are allocated among them will vary from one implementation to another, and may depend in part on the amount of data traffic that the system must handle during peak usage periods as well as during average usage periods, and may also depend on the amount of data processed by the collector network device 200.

Moreover, one or more of the blocks in FIGS. 2 and 3 may be implemented on one or more computer systems designed to provide the described functionality. For example, the controller network device 300 may be implemented on two distinct computing devices: a control device and an analysis device. The control device includes the machine interpretable code module 318 and the machine executable code module 334, and processes and modules therein. The analysis device includes the candidate event information module 326. In such configuration, the control device sends instructions to be performed by the collector network device 200 and the analysis device 300 collects and analyzes unauthorized activity data, optionally generates fingerprints.

Notwithstanding the discrete blocks in FIGS. 2 and 3, these figures are intended to be a functional description of some embodiments rather than a structural description of functional elements in the embodiments. One of ordinary skill in the art will recognize that an actual implementation might group or split the functional elements among various components. In practice, and as recognized by those of ordinary skill in the art, items shown separately could be combined and some items could be separated. For example, in some embodiments, the protected data 232 (FIG. 2) is stored within the operating system 210 (FIG. 2). In some embodiments, the interpreter 218 (FIG. 2) is implemented separate from the monitor module 216 (FIG. 2).

Figure 4:
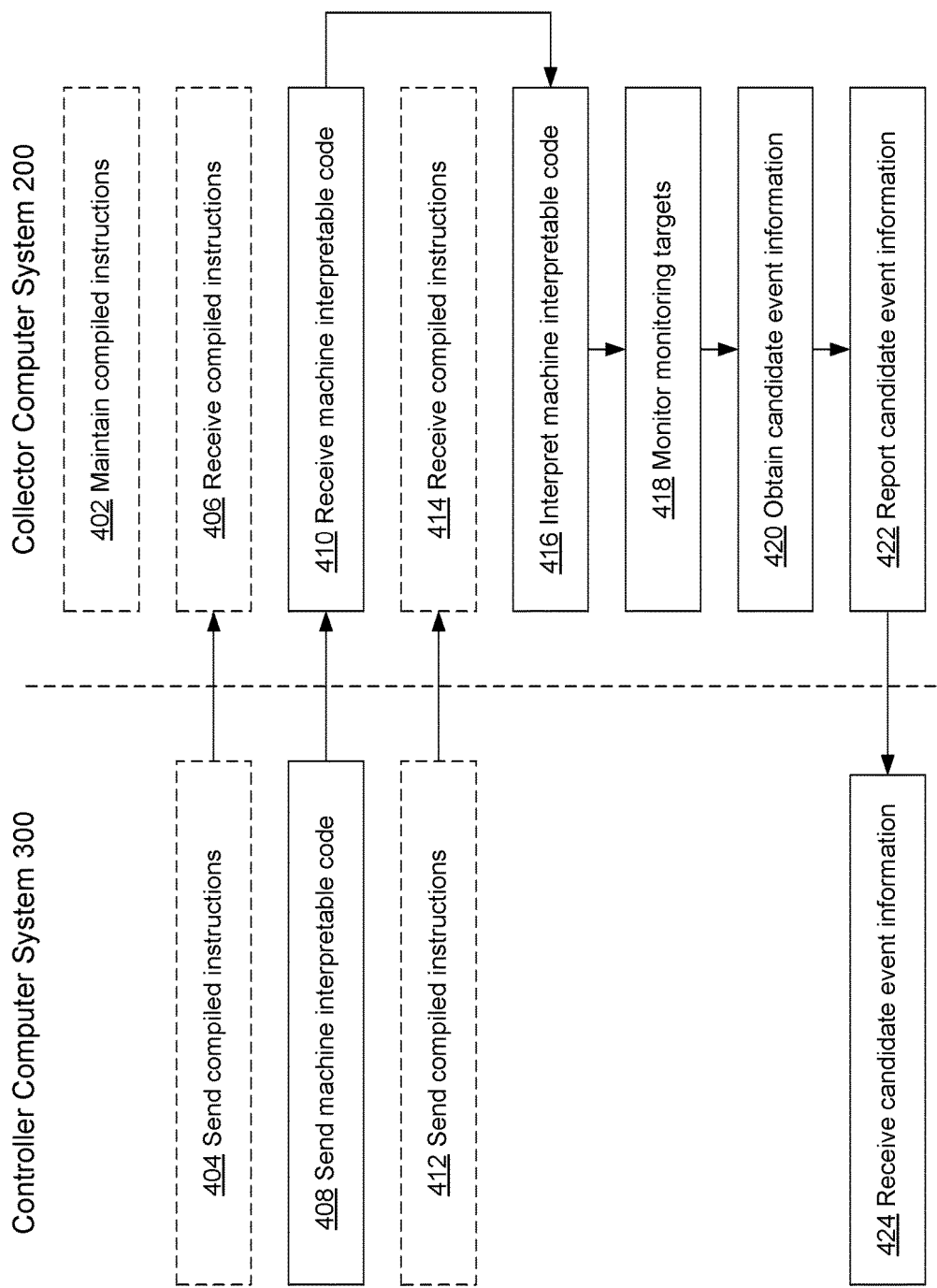
FIG. 4 is a high-level flow chart representing a method of monitoring a collector computer system, in accordance with some embodiments.

FIG. 4 is a high-level flow chart representing a method of monitoring a collector computer system, in accordance with some embodiments. The method illustrated in FIG. 4 involves a controller computer system 300 and one or more collector computer systems 200.

In some embodiments, the collector computer system 200 maintains (402) compiled instructions for monitoring one or more targets. For example, the compiled instructions have been preinstalled on the collector computer system 200.

In some embodiments, the controller computer system 300 sends compiled instructions to the collector computer system 200. In some embodiments, the controller computer system 300 sends (404) compiled instructions to the collector computer system 200 prior to sending machine interpretable code to the collector computer system 200, and the collector computer system 200 receives (406) the compiled instructions. In some embodiments, the compiled instructions are loaded to the collector computer system 200 from media (e.g., compact disc (CD), digital video disc (DVD), or any other portable storage device, such as a flash drive). In some embodiments, the controller computer system 300 sends (412) compiled instructions to the collector computer system 200 in conjunction with sending machine interpretable code to the collector computer system 200 (e.g., immediately before or after sending the machine interpretable code or concurrently with sending the machine interpretable code), and the collector computer system 200 receives (414) the compiled instructions. Alternatively, the collector computer system 200 receives the compiled instructions from a server that is distinct from the controller computer system 300 (e.g., a file server).

The controller computer system 300 sends machine interpretable code to the collector computer system 200. The machine interpretable code typically includes information identifying what to monitor (e.g., one or more monitoring targets), how to monitor (e.g., which instructions to use for monitoring), and predefined reporting criteria (e.g., when and/or what to report). For example, particular machine interpretable code corresponds to a script language "monitor write( ) function with write_hook( )."

The collector computer system 200 receives (410) the machine interpretable code, and interprets (416) the machine interpretable code. For example, the interpreter of the collector computer system 200 is used to interpret Protocol Buffers code to identify one or more of: the one or more monitoring targets, instructions to use for monitoring, and the predefined reporting criteria.

Based on the information in the machine interpretable code, the collector computer system 200 monitors (418) one or more monitoring targets (e.g., one or more processes, services, or applications; one or more files; one or more registry entries; and one or more portions of memory, such as one or more particular memory addresses, etc.). For example, the collector computer system 200 uses the write_hook( ) function to monitor activity associated with the write( ) function (e.g., parameters passed to the write( ) function in the operating system).

The collector computer system 200 obtains (420) candidate event information associated with a candidate activity (e.g., a suspicious activity or any other activity associated with one or more monitoring targets). For example, the collector computer system 200, by using the write_hook( ) function, obtains names of files accessed by the write( ) function and data written by the write( ) function (from the parameters passed to the write( ) function in the operating system).

The collector computer system 200 reports (422) the candidate event information (e.g., based on the predefined reporting criteria), and the controller computer system 300 receives (424) the candidate event information.

Thus, information needed for monitoring is provided separately from compiled instructions that are used for monitoring, thereby providing flexibility as to changing monitoring targets, methods of monitoring targets, and when and/or what to report. This is useful for monitoring a suspicious activity and for other purposes. More importantly, this allows changing the monitoring conditions without restarting or rebooting the collector computer system 200, while taking advantages of the benefits of compiled instructions that can operate at a low level (e.g., within a kernel or at a kernel level) and can perform generally faster than interpreted instructions.

Figure 5B:
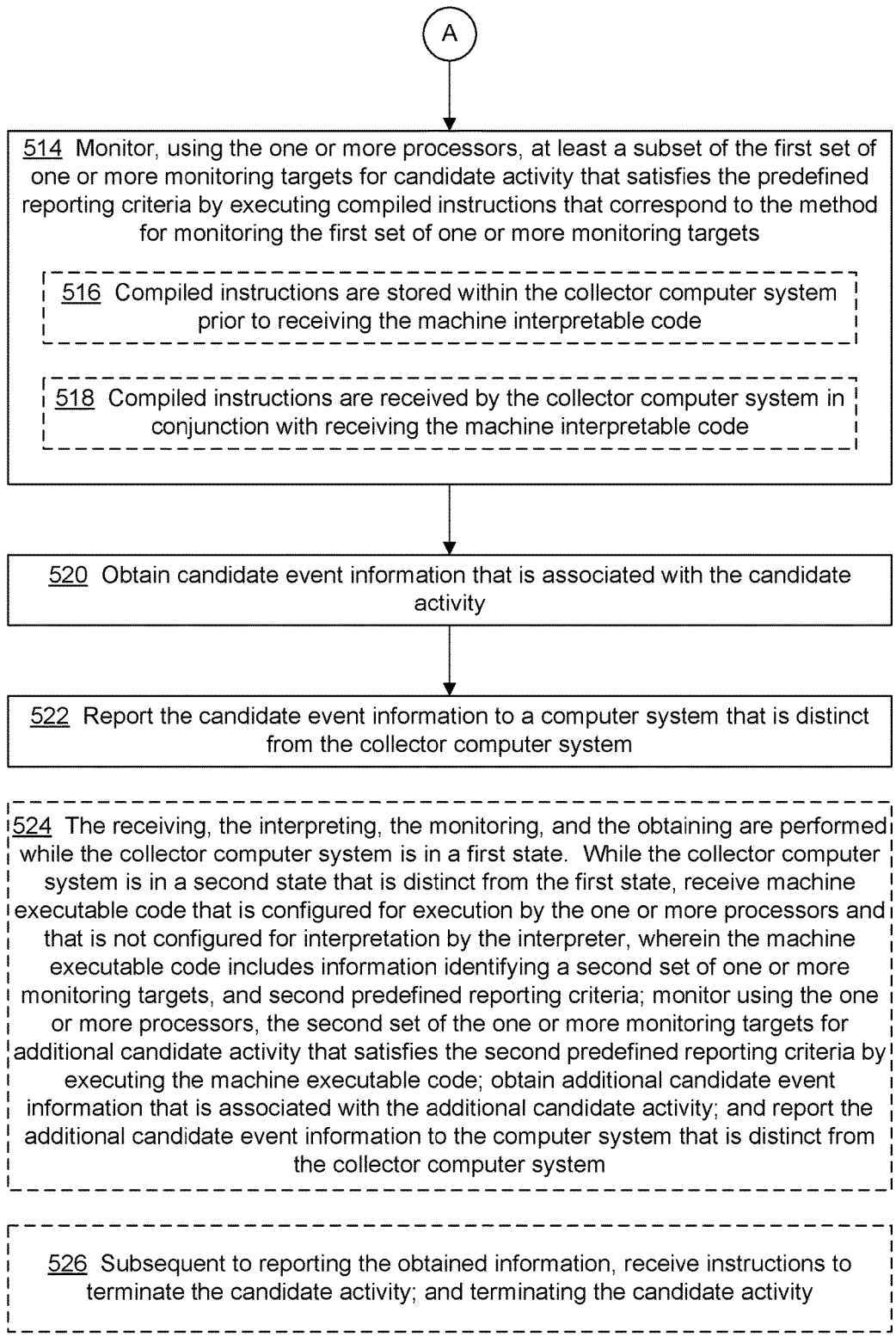

FIGS. 5A-5B are flowcharts representing a method 500 of monitoring a collector computer system 200, in accordance with some embodiments. The method 500 is performed by the collector computer system 200 that includes one or more processors 202 and memory 206 storing an interpreter 218 and compiled instructions 220 for execution by the one or more processors 202.

The collector computer system 200 receives (502) machine interpretable code that is configured for interpretation by the interpreter. The machine interpretable code is not directly executable by the one or more processors. For example, the machine interpretable code requires an interpretation by an interpreter to be executable. In comparison, executable code (e.g., an executable file) is configured for execution without further compilation or interpretation. In some embodiments, the machine interpretable code is a configuration file. The machine interpretable code includes: information identifying a first set of one or more monitoring targets within the collector computer system (e.g., a file creation operation), a method for monitoring the first set of one or more monitoring targets (also referred to herein as a monitoring protocol, such as functions or routines to use for monitoring the first set of one or more monitoring targets, or hooks for monitoring the first set of one or more monitoring targets), and predefined reporting criteria (e.g., conditions for reporting candidate event information). In some embodiments, the predefined reporting criteria include one or more state machines representing the conditions for reporting candidate event information. For example, the one or more state machines may indicate that, subsequent to a file creation operation is requested, the file creation operation is to be reported if the file creation operation is initiated by a notepad application and the file creation operation is not to be reported if the file creation operation is initiated by an application other than the notepad application. In another example, the one or more state machines may indicate that a combination of events, such as the file creation operation, of a file, requested by the notepad application followed by a file open operation, of the same file, requested by a word processing application (e.g., winword.exe), is to be reported. In some embodiments, although the machine interpretable code includes information identifying a function or routine to use for monitoring the first set of one or more monitoring targets, the machine interpretable code does not include the function or routine itself. In some embodiments, the collector computer system 200 receives the machine interpretable code without receiving any machine executable instructions.

In some embodiments, the machine interpretable code is (504) in a script language (e.g., Python, XML, etc.). In some embodiments, the machine interpretable code is an intermediary representation of instructions (e.g., Protocol Buffers, etc.).

In some embodiments, the first set of one or more monitoring targets includes (506) one or more of: one or more applications running on the collector computer system, one or more types of operations (e.g., processes) or services within the collector computer system, one or more regions of the memory, one or more registry entries, one or more network connection points (e.g., Internet protocol addresses and/or network port numbers), one or more mutex objects (e.g., program objects typically used for coordinating mutually exclusive access to a shared computer resource), and one or more memory operations.

In some embodiments, the predefined reporting criteria include (508) types of information for reporting. The types of information include one or more of: a timestamp (e.g., a timestamp of a candidate activity), one or more file names associated with the candidate activity (e.g., a file that is executed to perform a target operation, such as creating a file), one or more process names associated with the candidate activity (e.g., a process that requests to access a target memory address), one or more network connection points (e.g., Internet protocol addresses and/or network port numbers), one or more registry paths, one or more mutex objects (e.g., mutex object names), one or more library names, and one or more thread numbers and/or process numbers. In some embodiments, the types of information include a path of a file name associated with the candidate activity and attributes of a file associated with the candidate activity. In some embodiments, the types of information include an association of the candidate activity with other activities (e.g., which process created a file that is associated with the candidate activity, which files the candidate activity has created, etc.).

The collector computer system 200 interprets (510) the machine interpretable code with the interpreter to obtain the first set of one or more monitoring targets, the method for monitoring the first set of one or more monitoring targets, and the predefined reporting criteria. For example, the collector computer system 200 extracts from the machine interpretable code the first set of one or more monitoring targets, the method for monitoring the first set of one or more monitoring targets, and the predefined reporting criteria. In some embodiments, the collector computer system 200 obtains one or more of, but less than all of: the first set of one or more monitoring targets, the method for monitoring the first set of one or more monitoring targets, and the predefined reporting criteria.

In some embodiments, the interpreter is located (512) within the kernel and interpretation of the machine interpretable code is performed without rebooting the collector computer system subsequent to receiving the machine interpretable code. As explained above, operations within the kernel may be hidden from unauthorized users (e.g., attackers), thereby preventing the unauthorized users from finding out that the controller computer system 200 is being monitored. In addition, monitoring unauthorized activities from within the kernel facilitates detection of unauthorized activities, because most, if not all, input/output activities are ultimately handled by the kernel.

The collector computer system 200 monitors (514, FIG. 5B), using the one or more processors, at least a subset of the first set of one or more monitoring targets for candidate activity that satisfies the predefined reporting criteria by executing compiled instructions that correspond to the method for monitoring the first set of one or more monitoring targets (e.g., the compiled instructions are configured to cause the collector computer system 200, when executed by one or more processors of the collector computer system 200, to perform the method for monitoring the first set of one or more monitoring targets). For example, the collector computer system 200 inserts a hook and monitors system calls, keyboard or mouse events, and/or monitoring values stored in the memory.

In some embodiments, the compiled instructions are stored (516) within the collector computer system 200 prior to receiving the machine interpretable code. For example, the compiled instructions are preinstalled on the collector computer system 200 and/or received prior to receiving the machine interpretable code at a point in time independent of receiving the machine interpretable code (e.g., installed from mixed media, such as a DVD).

In some embodiments, the compiled instructions are received (518) by the collector computer system in conjunction with receiving the machine interpretable code (e.g., from the controller computer system or another computer system). For example, the compiled instructions are received concurrently, or immediately before or immediately after, receiving the machine interpretable code. In some cases, the compiled instructions are received before or after receiving the machine interpretable code (e.g., with a certain time interval).

The collector computer system 200 obtains (520) candidate event information that is associated with the candidate activity. For example, the collector computer system 200 obtains a file name, a path of the file name, a process name, a process number, a library name, a timestamp, a network connection point, a registry path, a mutex object, etc. associated with the candidate activity.

The collector computer system 200 reports (522) the candidate event information to a computer system that is distinct from the collector computer system 200 (e.g., the controller computer system 300). In some embodiments, the candidate event information is reported for inclusion in a fingerprint used to prevent subsequent malicious activity on other computers (e.g., other network devices 136 in FIG. 1).

In some embodiments, the receiving, the interpreting, the monitoring, and the obtaining are performed (524) while the collector computer system 200 is in a first state (e.g., a development mode). The collector computer system 200, while the collector computer system 200 is in a second state (e.g., a production mode) that is distinct from the first state, receives machine executable code that is configured for execution by the one or more processors and that is not configured for interpretation by the interpreter. For example, the machine executable code is obtained by compiling a programming language (e.g., the C programming language) for the collector computer system 200. The machine executable code includes information identifying a second set of one or more monitoring targets, and second predefined reporting criteria. The collector computer system 200 also monitors, using the one or more processors, the second set of the one or more monitoring targets for additional candidate activity that satisfies the second predefined reporting criteria by executing the machine executable code; obtains additional candidate event information that is associated with the additional candidate activity; and reports the additional candidate event information to the computer system that is distinct from the collector computer system.

In some embodiments, while the collector computer system 200 is in the second state (e.g., a production mode), the collector computer system 200 receives a profile (e.g., an XML configuration file that includes information identifying the second set of one or more monitoring targets and a method for monitoring the second set of one or more monitoring targets, such as one or more hooks), and monitors the second set of one or more monitoring targets using the compiled instructions (e.g., received as a mini driver).

In some embodiments, while the collector computer system 200 is in the first state (e.g., development mode), the collector computer system 200 reports any errors to the controller computer system 300. This facilitates debugging of the machine interpretable code.

In some other embodiments, the collector computer system 200 performs the receiving, the interpreting, the monitoring, and the obtaining, regardless of whether the collector computer system 200 is in the first state or the second state. For example, in some cases, the collector computer system 200 is configured to perform the receiving, the interpreting, the monitoring, and the obtaining as well as receiving and/or executing the machine executable code, when the collector computer system 200 is in the first state and also when the collector computer system 200 is in the second state.

In some embodiments, the collector computer system 200, subsequent to reporting the obtained information, receives (526) instructions to terminate the candidate activity; and thereafter terminates the candidate activity. For example, after the candidate event information is confirmed (e.g., at the controller computer system 300) to include information identifying malicious activity, the collector computer system 200 terminates (or kills) a process or service associated with the malicious activity. Additionally or alternatively, the collector computer system 200 may delete a file associated with the malicious activity and/or delete a registry entry associated with the malicious activity. In some cases, the collector computer system 200 collects additional information (e.g., additional information associated with the candidate activity and/or information associated with the collector computer system 200 in general), changes one or more settings (e.g., changes the access control of one or more files, closes on or more network ports, etc.), and/or stores its memory (e.g., by dumping its memory content to a non-volatile storage device). In some embodiments, the collector computer system 200 initiates one or more external processes (e.g., installing a previously saved image of the collector computer system 200 on the collector computer system 200).

Some of the features described above with respect to the method 500 are applicable to the method 600 described below. For brevity, such details are not repeated herein.

Figure 6A:
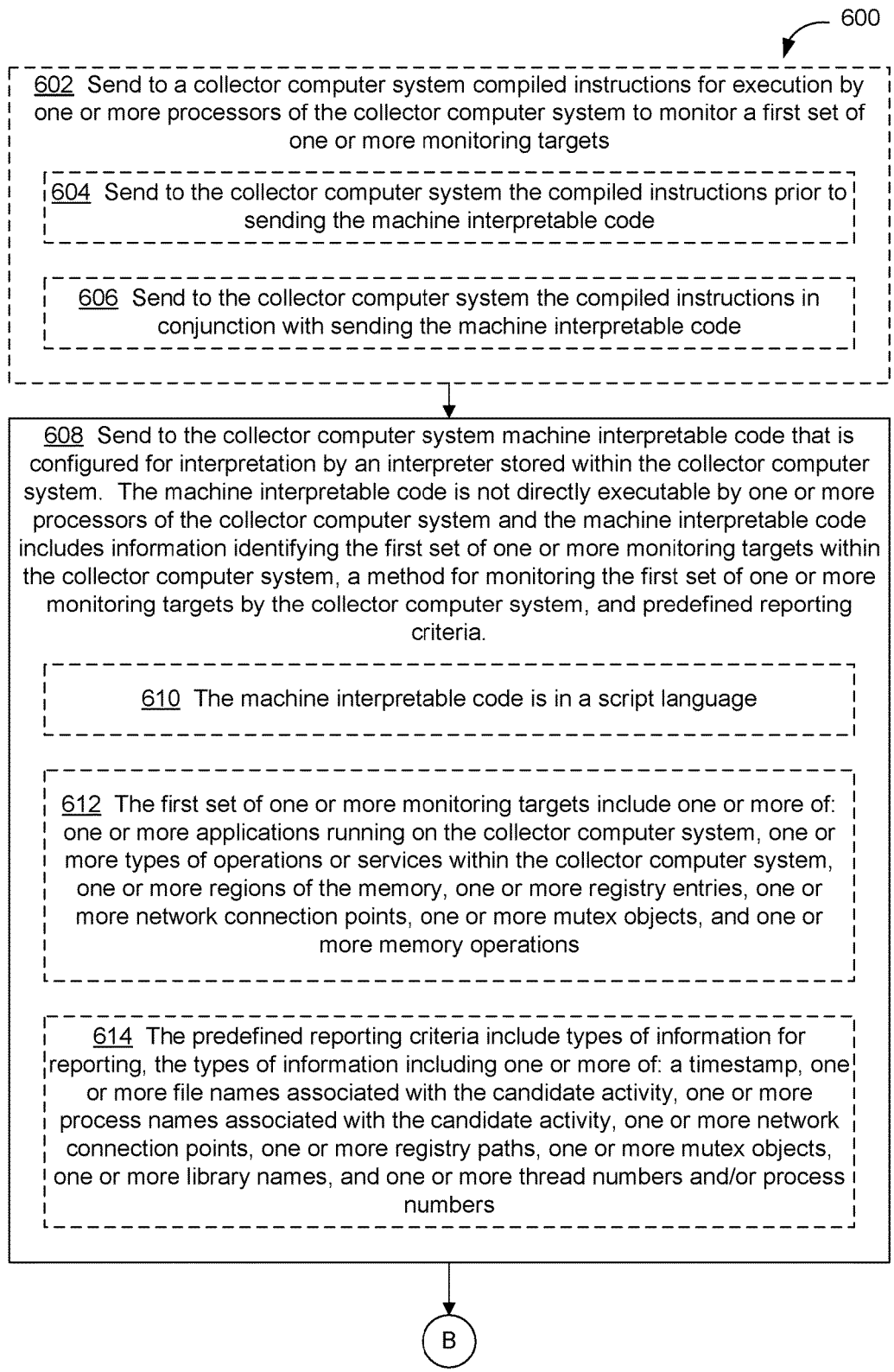

FIGS. 6A-6B are flowcharts representing a method 600 of monitoring a collector computer system 200 by one or more controller computer systems 300, in accordance with some embodiments. In some embodiments, the method 600 is performed by a controller computer system 300 that includes one or more processors 302 and memory 306 storing instructions for execution by the one or more processors 302. In some embodiments, the method 600 is performed by a group of multiple controller computer systems 300.

In some embodiments, the controller system 300 sends (602) to the collector computer system compiled instructions for execution by the one or more processors of the collector computer system to monitor the first set of one or more monitoring targets.

In some embodiments, the controller system 300 sends (604) to the collector computer system the compiled instructions prior to sending the machine interpretable code.

In some embodiments, the controller system 300 sends (606) to the collector computer system the compiled instructions in conjunction with sending the machine interpretable code.

The controller system 300 sends (608) to the collector computer system machine interpretable code that is configured for interpretation by an interpreter stored within the collector computer system. The machine interpretable code is not directly executable by one or more processors of the collector computer system and the machine interpretable code includes information identifying a first set of one or more monitoring targets within the collector computer system, a method for monitoring the first set of one or more monitoring targets by the collector computer system, and predefined reporting criteria.

In some embodiments, the machine interpretable code is (610) in a script language.

In some embodiments, the first set of one or more monitoring targets include (612) one or more of: one or more applications running on the collector computer system, one or more types of operations or services within the collector computer system, one or more regions of the memory, one or more registry entries, one or more network connection points, one or more mutex objects, and one or more memory operations.

In some embodiments, the predefined reporting criteria include (614) types of information for reporting, the types of information including one or more of: a timestamp, one or more file names associated with the candidate activity, one or more process names associated with the candidate activity, one or more network connection points, one or more registry paths, one or more mutex objects, one or more library names, and one or more thread numbers and/or process numbers.

The controller system 300 subsequent to sending to the collector computer system the machine interpretable code, receives (616, FIG. 6B) from the collector computer system candidate event information that is associated with a candidate activity with the first set of one or more monitoring targets.

In some embodiments, the controller system 300, subsequent to receiving the information, sends (618) to the collector computer system instructions to terminate the candidate activity on the collector computer system.

In some embodiments, the machine interpretable code is sent (620) for the collector computer system operating in a first state. For the collector computer system operating in a second state that is distinct from the first state, the controller system 300 sends machine executable code that is configured for execution by the one or more processors of the collector computer system and that is not configured for interpretation by the interpreter. The machine executable code includes information identifying a second set of one or more monitoring targets and second predefined reporting criteria. Subsequent to sending to the collector computer system the machine executable code, the controller system 300 receives additional candidate event information that is associated with the second set of one or more monitoring targets and that satisfies the second predefined reporting criteria.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings.

For example, in accordance with some embodiments, a computer implemented method, for monitoring a collector computer system that includes one or more processors and memory storing an interpreter and compiled instructions for execution by the one or more processors, includes receiving machine interpretable code that is configured for interpretation by the interpreter. The machine interpretable code is not directly executable by the one or more processors. The machine interpretable code includes information identifying a first set of one or more monitoring targets within the collector computer system, and a method for monitoring the first set of one or more monitoring targets. The method also includes interpreting the machine interpretable code with the interpreter to obtain the first set of one or more monitoring targets, and the method for monitoring the first set of one or more monitoring targets, and the predefined reporting criteria. The method further includes monitoring, using the one or more processors, at least a subset of the first set of one or more monitoring targets for candidate activity by executing compiled instructions that correspond to the method for monitoring the first set of one or more monitoring targets; obtaining candidate event information that is associated with the candidate activity (e.g., candidate activity that satisfies predefined reporting criteria, which may be preinstalled in the collector computer system or received by the collector computer system separately from the machine interpretable code); and reporting the candidate event information to a computer system that is distinct from the collector computer system.

In accordance with some embodiments, a computer implemented method, for monitoring a collector computer system by one or more controller computer system, at least a controller computer system comprising one or more processors and memory storing instructions for execution by the one or more processors, includes sending to the collector computer system machine interpretable code that is configured for interpretation by an interpreter stored within the collector computer system. The machine interpretable code is not directly executable by one or more processors of the collector computer system. The machine interpretable code includes information identifying a first set of one or more monitoring targets within the collector computer system, and a method for monitoring the first set of one or more monitoring targets by the collector computer system. The method also includes, subsequent to sending to the collector computer system the machine interpretable code, receiving from the collector computer system candidate event information that is associated with a candidate activity with the first set of one or more monitoring targets.

The embodiments in this application were chosen and described in order to best explain the principles and their practical applications, to thereby enable others skilled in the art to best utilize the described embodiments with various modifications as are suited to the particular use contemplated.

Furthermore, although the methods are described with respect to security application, it should be appreciated that similar methods can be used generally for monitoring behavior of a computer system that follows a source event. For example, similar methods can be used for rapid application development and debugging purposes.

What is claimed is:

1. A computer implemented method of monitoring a collector computer system, the collector computer system comprising one or more processors and memory storing an interpreter and compiled instructions for execution by the one or more processors, said method comprising:
   receiving, by the collector computer system, machine interpretable code that is configured for interpretation by the interpreter, wherein the machine interpretable code is not directly executable by the one or more processors and the machine interpretable code includes: information identifying a first set of one or more monitoring targets within the collector computer system, a method for monitoring the first set of one or more monitoring targets, and predefined reporting criteria;
   interpreting, by the collector computer system, the machine interpretable code with the interpreter to obtain the first set of one or more monitoring targets, the method for monitoring the first set of one or more monitoring targets, and the predefined reporting criteria;
   monitoring, by the collector computer system, at least a subset of the first set of one or more monitoring targets for candidate activity that satisfies the predefined reporting criteria by executing compiled instructions that correspond to the method for monitoring the first set of one or more monitoring targets;
   obtaining, by the collector computer system, candidate event information that is associated with the candidate activity; and
   reporting, by the collector computer system, the candidate event information to a computer system that is distinct from the collector computer system,
   wherein the compiled instructions are generated by a compiler in a second computer system that is distinct from the collector computer system, and the method includes receiving the compiled instructions from the second computer system for storing the compiled instructions in the memory.

2. The method of claim 1, wherein the machine interpretable code is in a script language.

3. The method of claim 1, wherein the first set of one or more monitoring targets includes one or more of: one or more applications running on the collector computer system, one or more types of operations or services within the collector computer system, one or more regions of the memory, one or more registry entries, one or more network connection points, one or more mutex objects, and one or more memory operations.

4. The method of claim 1, wherein the predefined reporting criteria include types of information for reporting, the types of information including one or more of: a timestamp, one or more file names associated with the candidate activity, one or more process names associated with the candidate activity, one or more network connection points, one or more registry paths, one or more mutex objects, one or more library names, and one or more thread numbers and/or process numbers.

5. The method of claim 1, wherein the receiving, the interpreting, the monitoring, and the obtaining are performed while the collector computer system is in a first state, the method further including:
while the collector computer system is in a second state that is distinct from the first state:
receiving machine executable code that is configured for execution by the one or more processors and that is not configured for interpretation by the interpreter, wherein the machine executable code includes information identifying a second set of one or more monitoring targets, and second predefined reporting criteria;
monitoring using the one or more processors, the second set of the one or more monitoring targets for additional candidate activity that satisfies the second predefined reporting criteria by executing the machine executable code;
obtaining additional candidate event information that is associated with the additional candidate activity; and
reporting the additional candidate event information to the computer system that is distinct from the collector computer system.

6. The method of claim 1, wherein the compiled instructions are stored within the collector computer system prior to receiving the machine interpretable code.

7. The method of claim 1, wherein the compiled instructions are received by the collector computer system in conjunction with receiving the machine interpretable code.

8. The method of claim 1, further comprising:
subsequent to reporting the obtained information:
receiving instructions to terminate the candidate activity; and
terminating the candidate activity.

9. The method of claim 1, wherein the interpreter is located within the kernel and interpretation of the machine interpretable code is performed without rebooting the collector computer system subsequent to receiving the machine interpretable code.

10. The method of claim 1, wherein the interpreting includes:
converting, by the interpreter, the machine interpretable code into machine executable code.

11. The method of claim 10, wherein the compiled instructions and the machine executable code are configured for execution by the one or more processors without use of a compiler or the interpreter.

12. The method of claim 1, wherein the monitoring operation is performed subsequent to interpreting the machine interpretable code with the interpreter.

13. A collector computer system, comprising:
one or more processors; and
memory storing one or more programs that include an interpreter and compiled instructions, the one or more programs, when executed by the one or more processors, cause the collector computer system to:
receive machine interpretable code that is configured for interpretation by the interpreter, wherein the machine interpretable code is not directly executable by the one or more processors and the machine interpretable code includes: information identifying a first set of one or more monitoring targets within the collector computer system, a method for monitoring the first set of one or more monitoring targets, and predefined reporting criteria;
interpret the machine interpretable code with the interpreter to obtain the first set of one or more monitoring targets, the method for monitoring the first set of one or more monitoring targets, and the predefined reporting criteria;
monitor at least a subset of the first set of one or more monitoring targets for candidate activity that satisfies the predefined reporting criteria by executing compiled instructions that correspond to the method for monitoring the first set of one or more monitoring targets;
obtain candidate event information that is associated with the candidate activity; and
report the candidate event information to a computer system that is distinct from the collector computer system,
wherein the compiled instructions are generated by a compiler in a second computer system that is distinct from the collector computer system, and the one or more programs, when executed by the one or more processors, cause the collector computer system to receive the compiled instructions from the second computer system for storing the compiled instructions in the memory.

14. The system of claim 13, wherein the one or more programs cause the collector computer system to convert, with the interpreter, the machine interpretable code into machine executable code.

15. The system of claim 14, wherein the compiled instructions and the machine executable code are configured for execution by the one or more processors without use of a compiler or the interpreter.

16. The system of claim 13, wherein the one or more programs, when executed by the one or more processors, cause the collector computer system to perform the monitoring operation subsequent to interpreting the machine interpretable code with the interpreter.

17. A non-transitory computer readable storage medium, storing one or more programs that include an interpreter and compiled instructions for execution by one or more processors of a collector computer system, the one or more programs including instructions for:
receiving machine interpretable code that is configured for interpretation by the interpreter, wherein the machine interpretable code is not directly executable by the one or more processors and the machine interpretable code includes: information identifying a first set of one or more monitoring targets within the collector computer system, a method for monitoring the first set of one or more monitoring targets, and predefined reporting criteria;

interpreting the machine interpretable code with the interpreter to obtain the first set of one or more monitoring targets, the method for monitoring the first set of one or more monitoring targets, and the predefined reporting criteria;

monitoring at least a subset of the first set of one or more monitoring targets for candidate activity that satisfies the predefined reporting criteria by executing compiled instructions that correspond to the method for monitoring the first set of one or more monitoring targets;

obtaining candidate event information that is associated with the candidate activity; and reporting the candidate event information to a computer system that is distinct from the collector computer system, wherein the compiled instructions are generated by a compiler in a second computer system that is distinct from the collector computer system, and the one or more programs include instructions for receiving the compiled instructions from the second computer system for storing the compiled instructions in the memory.

18. The non-transitory computer readable storage medium of claim 17, wherein the one or more programs include instructions for converting, with the interpreter, the machine interpretable code into machine executable code.

19. The non-transitory computer readable storage medium of claim 18, wherein the compiled instructions and the machine executable code are configured for execution by the one or more processors without use of a compiler or the interpreter.

20. The non-transitory computer readable storage medium of claim 17, wherein the one or more programs include instructions for performing the monitoring operation subsequent to interpreting the machine interpretable code with the interpreter.

* * * * *